May 10, 1955 — T. CIOLLI — 2,707,844
RODENT TRAP
Filed Sept. 22, 1954

INVENTOR
Thomas Ciolli.
BY
ATTORNEY

United States Patent Office 2,707,844
Patented May 10, 1955

2,707,844
RODENT TRAP
Thomas Ciolli, Detroit, Mich.

Application September 22, 1954, Serial No. 457,610

3 Claims. (Cl. 43—62)

This invention relates to a trap for rodents such as rats or mice, and has as its primary object the provision of an improved trap for capturing rodents alive in order that they may be disposed of in a humane and painless manner.

An additional object of the invention is the provision of a trap which will capture the rodent without leaving any evidence of violence, whereby the trap may be reemployed without giving warning to subsequent rodents entering the same.

Still another object of the invention is the provision of a trap of this character which is sturdy and durable in construction, reliable and efficient in operation and relatively simple and inexpensive to manufacture and assemble.

Still other objects will in part be obvious and in part be pointed out hereinafter as the description of the invention proceeds and shown in the accompanying drawing disclosing a preferred embodiment of this inventive concept.

In the drawing.

Similar reference characters refer to similar parts throughout the several views of the drawings.

Figure 1:
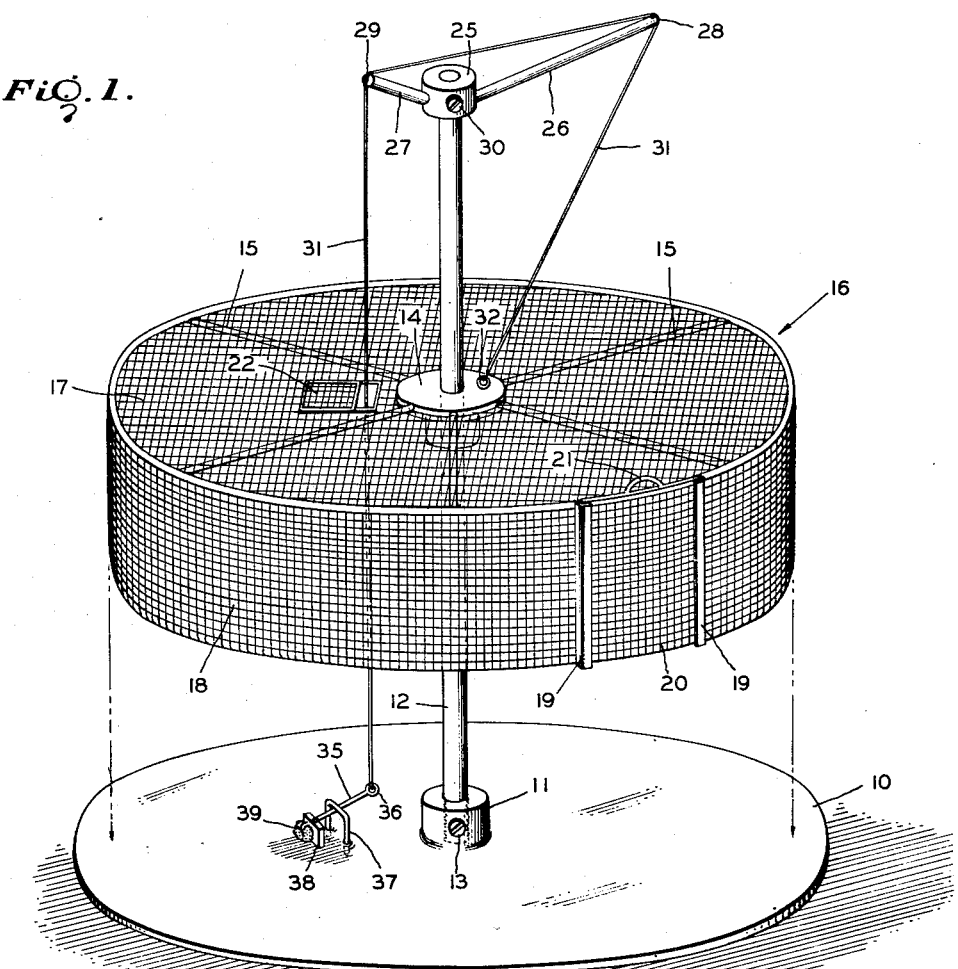
Fig. 1 is a perspective view of the trap in its entirety.

Referring now to the drawing in detail, there is shown at 10 a base, preferably circular in form and provided with a centrally positioned upwardly extending socket 11. Seated in the socket 11 is an upright shaft 12 secured in position as by a set screw 13. A slide bushing 14 encircles shaft 12 and has extending therefrom a plurality of radial arms 15 which serve to support a circular wire cage, generally indicated at 16 and having a wire mesh top 17 and an annular wire mesh side wall 18. The bottom of cage 16 is open whereby when the trap is dropped in a manner to be more full described hereinafter, a rodent may be trapped on the base. A pair of opposed guides 19 engage the edges of a sliding door 20 provided with a lift handle 21 in the side wall 18, and a bait door 22 is provided in the top 17.

Shaft 12 extends upwardly a substantial distance above slide bushing 14, when the latter is in raised position, and has adjacent its top a collar 25 from which extends an elongated arm 26 and a diametrically opposed shorter arm 27. Arms 26 and 27 are provided at their extremities with pulleys 28 and 29 respectively. Collar 25 is secured in position on shaft 12 by means of a set screw 30, and by variation of the position of collar 25 on shaft 12, the height to which cage 16 is raised in set position may be varied.

A cord 31 extends from a bolt 32, or the like, in bushing 14 and thence over pulleys 28 and 29 downwardly through the bait door opening 22 to a trip pin 35 having a loop 36 at one end, and adapted to be secured in position by means of a U-shaped bracket 37 secured to base 10. A separate bait holding member comprising a plate or pan 38 and a bait holding pin 39 is adapted seat under one end of trip pin 35.

Figure 3:
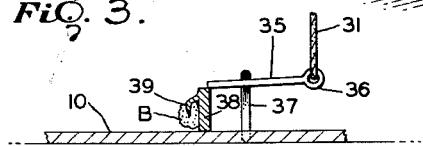
Fig. 3 is a vertical detailed cross sectional view of the trigger mechanism, enlarged.
Figure 2:
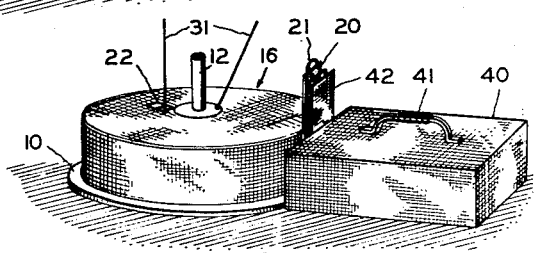
Fig. 2 is a reduced perspective view disclosing the supplemental rodent removal cage and the method of removing a rodent from the trap.
Figure 4:
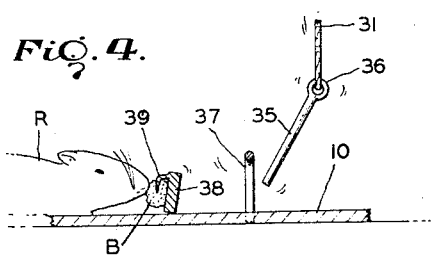
Fig. 4 is a view similar to Fig. 3 showing the trigger as tripped by a rodent.

In setting the trap cage 16 is raised as disclosed in Fig. 1. Trip pin 35 is then positioned beneath bracket 37, and bait pan 38 is positioned under an end of pin 35, as disclosed in Fig. 3, to retain cage 16 in raised position. When a rodent R nibbles the bait B, as shown in Fig. 4, the pan 38 is dislodged and the weight of cage 16 displaces trip pin 35 permitting the former to fall on base 10, effectively trapping the rodent.

When it is desired to remove the rodent from the trap, a supplemental cage 40 of any desired type, provided preferably with a lifting handle 41 and a slide door 42 is positioned adjacent the door 20, and doors 20 and 42 are raised, permitting the rodent to enter supplemental cage 40. The supplemental cage is then removed, after closing the doors, and may if desired be positioned adjacent the exhaust of a motor vehicle to asphyxiate the rodent, or alternately, submerged in water to drown the rodent.

As many embodiments may be made of this inventive concept and as many modifications may be made in the embodiment hereinbefore shown and described, it is to be understood that all matter herein is to be interpreted merely as illustrative and not in a limiting sense.

What is claimed is:

1. In a device of the character described, in combination, a base, a slide shaft centrally mounted thereon, a slide bushing surrounding said slide shaft, radial arms extending from said bushing, a wire mesh cage supported by said arms, said cage comprising a top and a depending annular flange, a collar fixed to said shaft above the top of said cage, arms extending from said collar, a cord extending over the ends of said arms, having one end secured to said bushing, a trip pin secured to the other end of said cord, a trip pin anchoring bracket mounted on said base, and a releasable bait pan adapted to hold an end of said pin in position beneath said bracket, movement of said bait pan permitting release of said pin from said bracket to allow said cage to fall on said base.

2. In a device of the character described, in combination, a base, a slide shaft centrally mounted thereon, a slide bushing surrounding said slide shaft, radial arms extending from said bushing, a wire mesh cage supported by said arms, said cage comprising a top and a depending annular flange, a collar fixed to said shaft above the top of said cage, arms extending from said collar, a cord extending over the ends of said arm, having one end secured to said bushing, a trip pin secured to the other end of said cord, a trip pin anchoring bracket mounted on said base, and a releasable bait pan adapted to hold an end of said pin in position beneath said bracket, movement of said bait pan permitting release of said pin from said bracket to allow said cage to fall on said base, said cage being provided with a sliding release door in the annular flange thereof.

3. In a device of the character described, in combination, a base, a slide shaft centrally mounted thereon, a slide bushing surrounding said slide shaft, radial arms extending from said bushing, a wire mesh cage supported by said arms, said cage comprising a top and a depending annular flange, a collar adjustably mounted on said shaft above the top of said cage, a set screw for holding said collar in a selected position of adjustment, arms extending from said collar, pulleys at the extremities of said arms, a cord extending over said pulleys, having one end secured to said bushing, a trip pin anchoring bracket mounted on said base, and a releasable bait pan adapted to hold an end of said pin in position beneath said bracket, movement of said bait pan permitting release of said pin from said bracket to allow said cage to fall on said base.

References Cited in the file of this patent
UNITED STATES PATENTS

| | | |
|---|---|---|
| 104,406 | Arnold | June 21, 1870 |
| 822,543 | Murphy | June 5, 1906 |
| 1,088,477 | De St. Legier | Feb. 24, 1914 |